United States Patent [19]

Hoshizaki et al.

[11] Patent Number: 4,963,718
[45] Date of Patent: Oct. 16, 1990

[54] METHOD OF READING A BAR CODE ON A MOVING CYLINDRICAL BODY

[75] Inventors: Tatsuji Hoshizaki, Odawara; Norio Sakamoto, Sagamihara, both of Japan

[73] Assignee: Konica Corporation, Tokyo, Japan

[21] Appl. No.: 287,373

[22] Filed: Dec. 21, 1988

[51] Int. Cl.$^5$ .......................... G06K 7/10; G06K 9/18
[52] U.S. Cl. ..................................... 235/462; 235/464; 235/470
[58] Field of Search ............... 235/375, 462, 383, 464, 235/470, 467, 454; 250/223 R, 223 B, 224, 566, 568; 355/41

[56] References Cited

U.S. PATENT DOCUMENTS

| | | | |
|---|---|---|---|
| 4,193,540 | 3/1980 | Dougados et al. | 235/467 |
| 4,201,338 | 5/1980 | Keller | 250/223 B |
| 4,713,536 | 12/1987 | Williams et al. | 250/223 B |
| 4,809,342 | 2/1989 | Kappner | 235/464 |
| 4,888,613 | 12/1989 | Zangenfeind et al. | 355/41 |

Primary Examiner—Stuart S. Levy
Assistant Examiner—Robert A. Weinhardt
Attorney, Agent, or Firm—Finnegan, Henderson, Farabow, Garrett, and Dunner

[57] ABSTRACT

A method of reading a bar code printed on a photographic film cartridge in which the bar code has a certain arc length on the cartridge. The cartridge is transported on a conveyor and positioned on the conveyer so that the normal line intersecting at the middle point of the arc length forms an acute angle to the transporting direction of the conveyor. The bar code is irradiated with a light beam of a bar code reader while the cartridge is transported on a conveyor, and the irradiating angle with the transporting direction is determined smaller than the acute angle of the normal line intersecting the bar code.

5 Claims, 6 Drawing Sheets

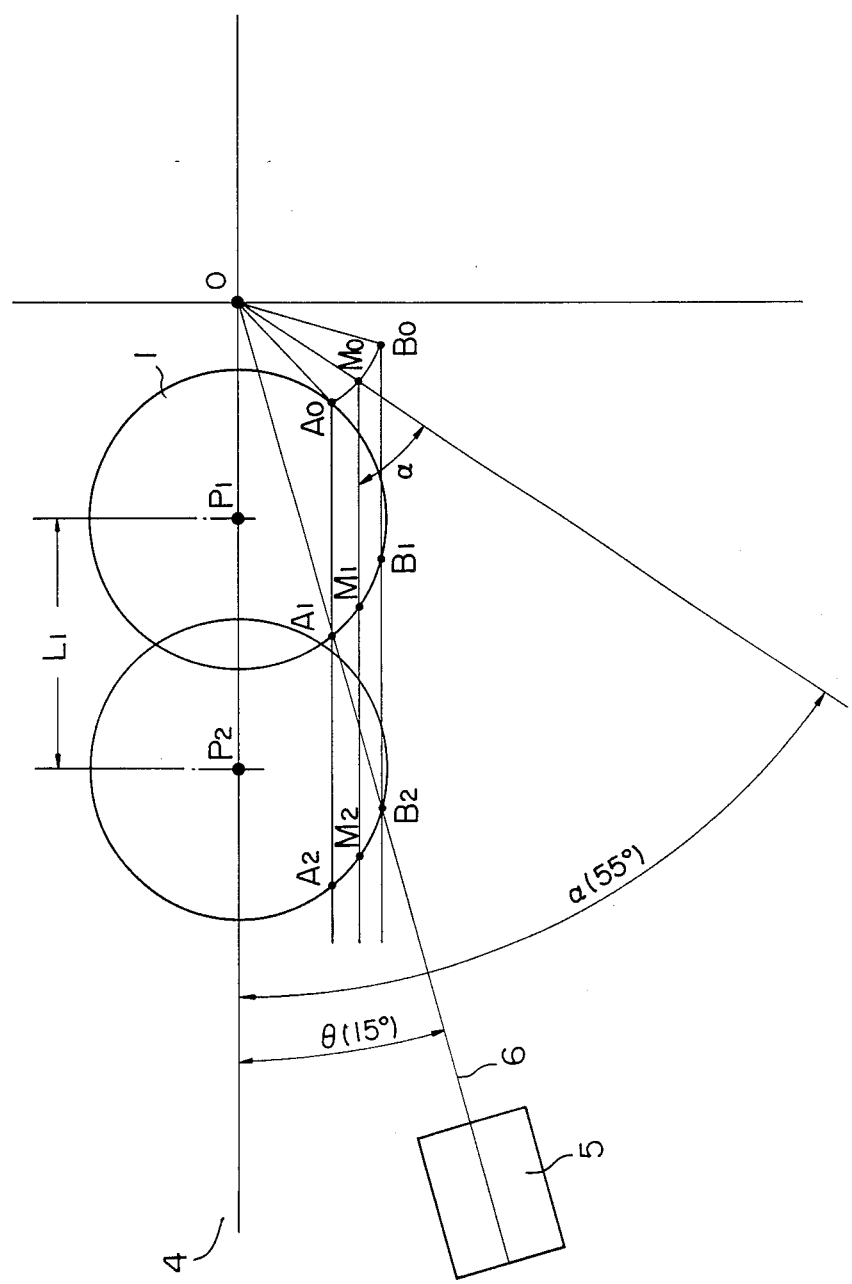

METHOD OF READING A BAR CODE ON A MOVING CYLINDRICAL BODY

BACKGROUND OF THE INVENTION

This invention relates to a method of reading a bar code which indicates an information on an article.

Bar code systems are used effectively in the situation that the products, which are mass-produced, especially produced in various types, distributed and transported, are assorted according to their objectives in the highly reliable, quick, automatic and energy saving condition.

The above-described bar code systems are classified into optical or other non-contact types and electrical or other contact types. The former types are used more often than the other types except in certain cases and the optical reflection system using a light beam is the actual type of the most cases.

FIG. 3 shows an example of a method for reading a bar code printed on the surface of a cylindrical object, a cartridge of photo film, during its transportation.

On cartridge 1, DX code 2, indicating characteristics and other information about the film, is printed on the cylindrical surface as shown in FIG. 4, and bar code 3, relating to manufacture and additional informations, is printed on one or both sides of the surface.

Cartridge 1 is set at a position on carrying belt 4 where light beam 6 from bar code reader 5 irradiates exactly bar code 3 by the precise positioning unit. When the cartridge comes to the reading position on carrying belt 4, it is detected by a pair of photoelectric sensors 7, the light beam 6 scans the bar code 3 in a vertical direction and reads the bar code. However, since cartridge 1 is being transferred, the bar code must be read at high speed and in a snort time.

As described above, the cartridge must be precisely positioned on the carrying belt beforehand and, since the reading time is limited, malfunction is likely to occur. In order to prevent malfunctions, the carrying speed should be slower or the bar code should be larger in size; these are disadvantages to result in a decrease in efficiency.

SUMMARY OF THE INVENTION

This invention was created to solve the above disadvantages. When reading the bar code printed on the surface of a cylindrical object such as a cartridge, reliable and problem-free reading substantially becomes possible by irradiating a light beam to read the bar code within the angle range smaller than the acute angle, on the side where the bar code printing area exists, of the angles made by the normal line through the midpoint of the bar code printing area and a parallel line of the cartridge carrying direction.

DETAILED DESCRIPTION OF THE INVENTION

Figure 1:
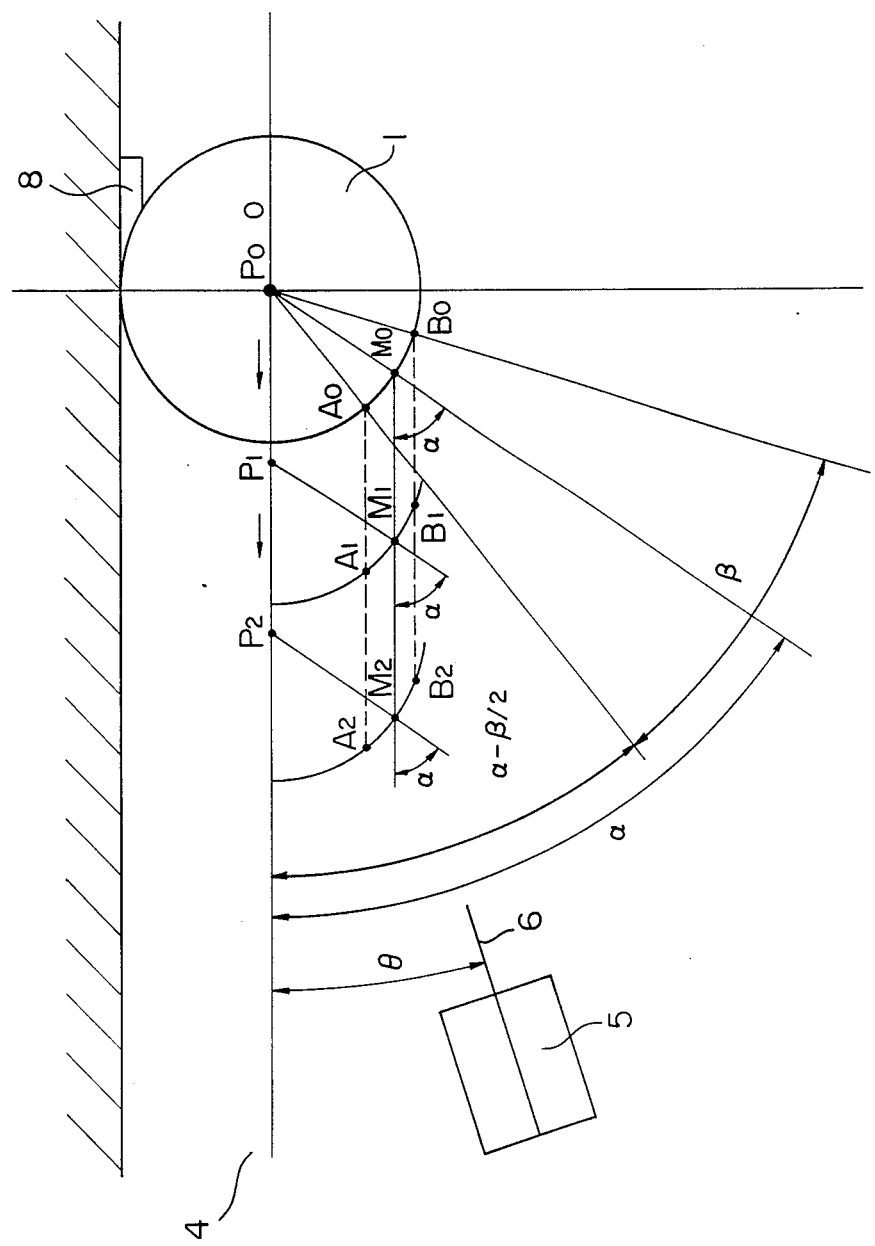
FIG. 1 is a plan showing the angle, positional relations, and the moving conditions of the carrying belt, the cylindrical member on which bar code is printed, the bar code reader, the light beam and etc.
Figure 2B:
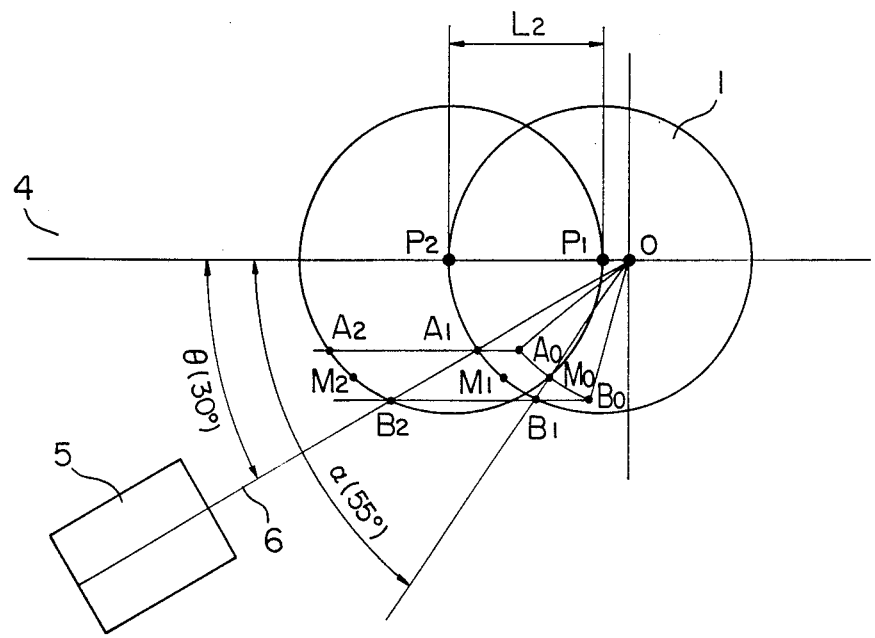
FIG. 2 is plans showing the above relational conditions changed in various cases; (A) shows the case where the light beam angle $\theta$ is 15°, and (B), (C), (D), and (E) show the cases of 30°, 45°, 55°, and 75° respectively.
Figure 2C:
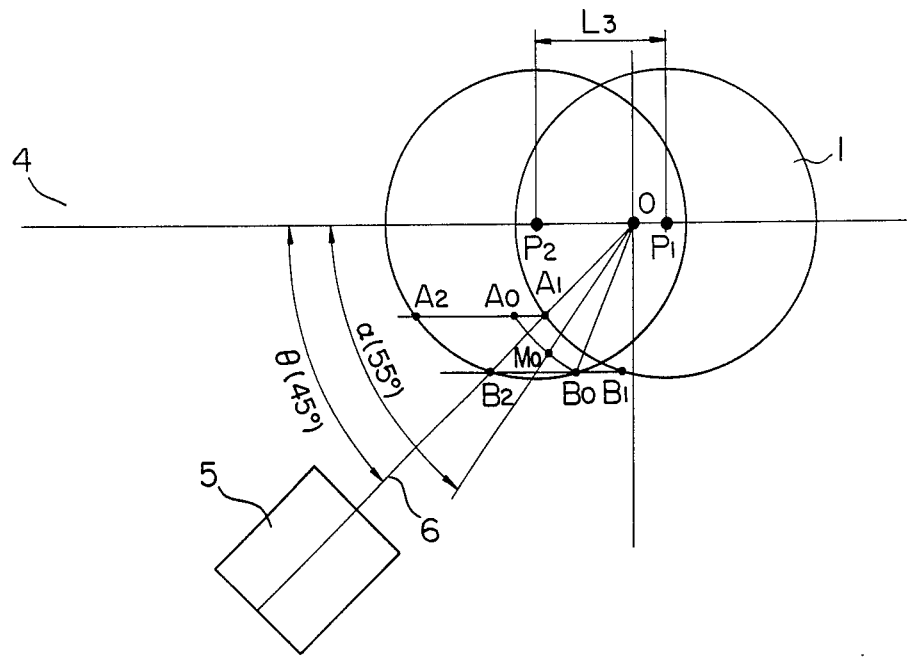
Figure 2D:
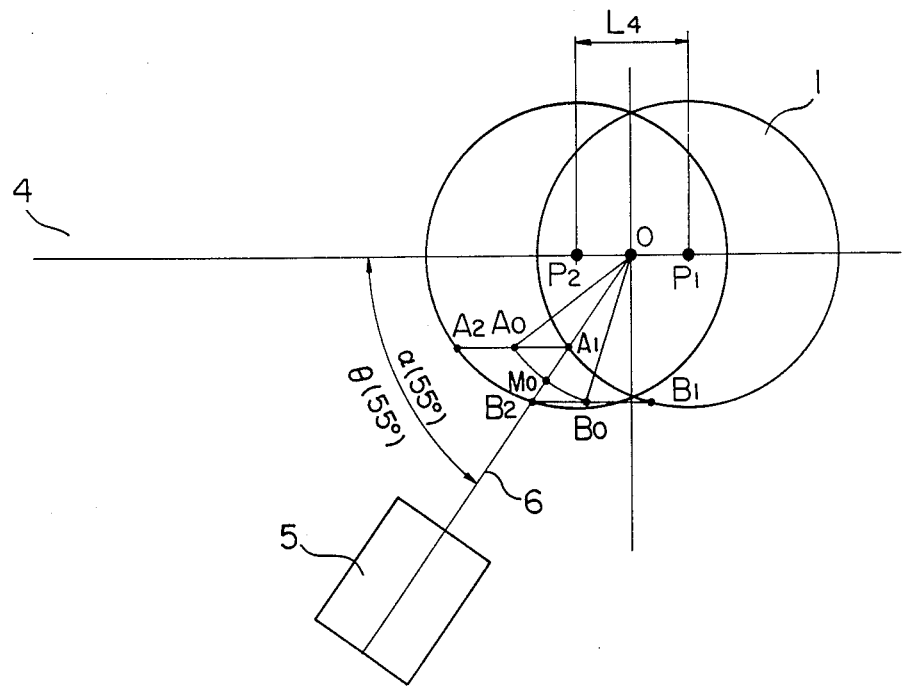
Figure 2E:
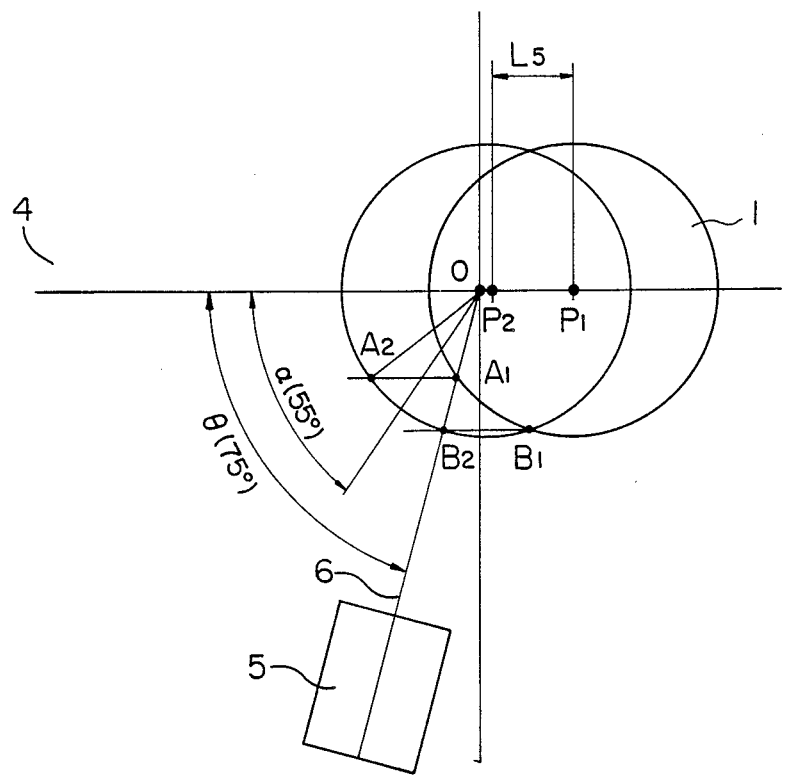
Figure 3:
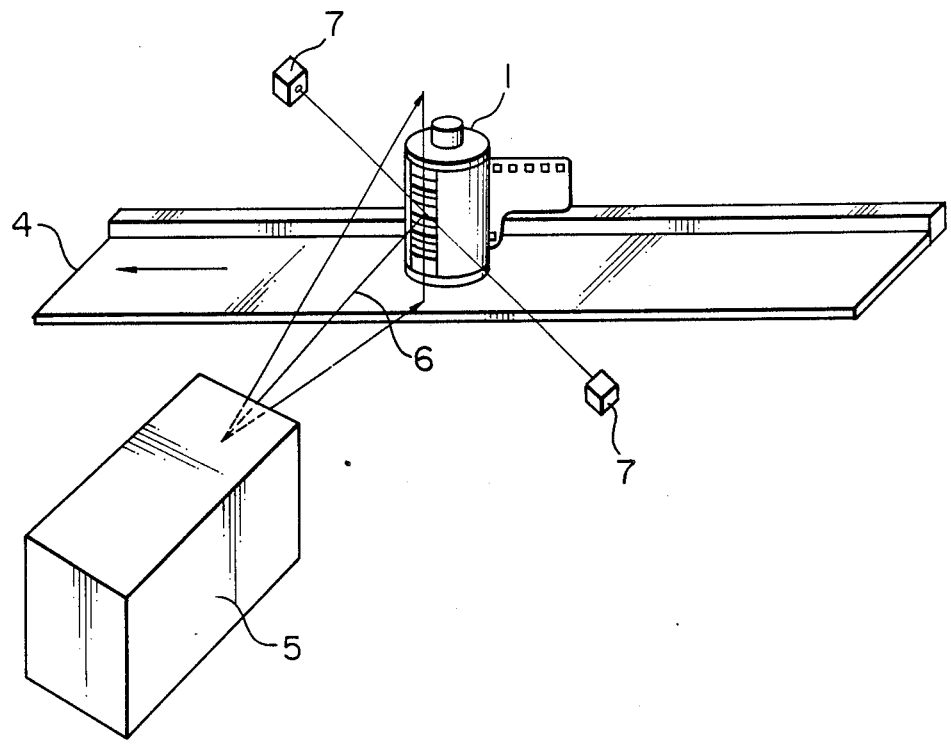
FIG. 3 is a perspective diagram showing the relations of the carrying belt, the cartridge and its bar code, the bar code reader and the pair of light sensors, and others.
Figure 4:
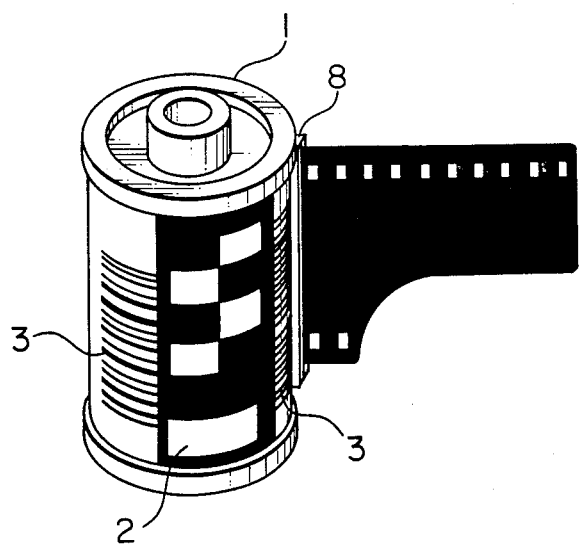
FIG. 4 is a perspective diagram of a cartridge on which a bar code and DX code are printed.

FIG. 1 is a view of carrying belt 4, cartridge 1 which a bar code is printed on its surface and placed on the belt, reader 5 to read the bar code, light beam 6, and their positional and angular relations. FIG. 2 (A) – (E) show the effects upon changes of their positional and angle relations.

In FIG. 1, cartridge 1 is placed that its film take-out port 8 is directed parallel to the carrying direction at the edge of the carrying belt 4. Here, the light beam 6 is set at the angle $\theta$ so that the bar code can be read effectively while the angle which is created by the center line $P_0$-$M_0$ of the bar code 3 on the cartridge and carrying belt 4 is determined $\alpha$. The intersecting point of this light beam 6 and the carrying locus of the center $P_0$ of the cartridge is O.

Now as the cartridge 1 is carried, the center $P_0$ of the cartridge is moved from $P_1$ to $P_2$ by the carrying belt 4. Accordingly, $A_0$ moves from $A_1$ to $A_2$, $B_0$ from $B_1$ to $B_2$, and $M_0$ from $M_1$ to $M_2$, respectively. Bar code 3 is printed from $A_0$ to $B_0$ on the cartridge. The angle made by $A_0$, $P_0$ and $B_0$ is $\beta$. The conditions, that enable the most effective reading by selecting the angle $\theta$ of the carrying belt 4 and light beam 6 and angle $\alpha$ of the carrying belt 4 and light beam 6 and angle $\alpha$ of the center line $P_0$ - $M_0$ of the bar code 3 for the longest reading time in the same carrying speed, are set as follows.

FIG. 2 shows the cases where these relations are changed in various ways. Usually the printed bar code on the cartridge is positioned at an angle of 55° as shown in the figure; therefore the example according to the case is explained below. FIG. 2 (A) shows the case where the angle $\theta$ is 15°: When the center of the cartridge 1 comes to $P_1$, light beam 6 begins reading the bar code from its beginning $A_1$, and when the center is moved to $P_2$, the light beam reaches the final end of the bar code $B_2$ and the reading is completed. Therefore, bar code reading is possible while the center of the cartridge moves from $P_1$ to $P_2$, or length $L_1$ in the figure.

Likewise, bar code reading is possible while the center of the cartridge moves in the distances of $L_2$ in FIG. 2 (B) and $L_3$ in Fig. (C), respectively. Fig. (D) shows a case where both the angle $\theta$ and $\alpha$ are the same of 55°, and bar code reading is possible in the length of $L_4$. In Fig. (E), the angle $\theta$ is 75°, larger than the angle $\alpha$ of 55°, and bar code reading is possible only in the short length of $L_5$. From the above, it is known that possible reading length (time) becomes shorter from $L_1$ to $L_5$ as the angle $\theta$ (15°–75°) in relation to the angle $\alpha$ (55°) becomes larger. The above angle 15° is a limitation angle that the bar code reader does not interfere with the carrying conveyor. At the condition of $L_5$ in FIG. 2 (E), the possible reading length is about ⅓ of $L_1$, and for a bar code reader of a normal light beam scanning speed, effective reading frequency reduces to the number that its bar code reading becomes substantially impossible. Conversely, a bar code reading at a speed 3 times faster than the normal speed becomes possible by setting the installing angle of a reader, according to this invention, while the same cartridge and bar code reader are used. On the other hand, when using the bar code reader at the normal carrying speed, the angle $\beta$ of a bar code on the cartridge can be reduced according to this invention. That is, since the bar code area can be smaller, the space provided for the bar code on the cartridge, which is required to have a certain amount for the sake of design, can be reduced. Thus, the effective reading conditions according to this invention is expressed by equation 1.

$$\alpha \geq \theta \text{tm} \quad (1)$$

As described above, the angle $\theta$ is effective from 15 to 55° in this case and the smaller angle is more effective. At this time, the bar code reader should be the one having a focus depth of more than Li (i = 1, 2, 3, 4). Conditions of this invention were clarified in the above description of drawings; however, various conditions, time, length, angle, and etc. can be actually calculated geometrically. In addition, the same concept can be applied to the situation that the bar code is printed on a different position. In this embodiment, when $\theta$ is smaller than 15°, bar code reading becomes relatively impossible because of the matters such as the installation of the bar code reader and the reflectance of a light beam on the cartridge surface. To this invention, carrying belts which are used for ordinal productions can be applied. Also the bar code reader, which integrates a laser radiator, its optical scanning system, and a decoder unit which converts light signal from the bar code photoelectrically, shapes the waveform, and decodes it, is available on the market. A system according to this invention can be composed by using them.

As described above, to read the bar code printed on a cylindrical surface such as a film cartridge on a moving carrying belt, a method, which is to read bar code stably, efficiently, and reliably without reducing the reading speed, can be established by satisfying the conditions of this invention with regard to the angle and position of the bar code on the carrying belt, and the positional and angular relations among the installation position of the bar code reader, the angle of the light beam irradiation, and etc. According to the method of this invention, setting of the reading system on the cartridge carrying belt is relatively easy and it can be realized by using ordinal carrying belt, bar code reader, and other means.

What is claimed is:

1. A method of reading a bar code printed on a cylindrical surface of an article, wherein the printed area of the bar code has a given arc length around the cylindrical surface, the method comprising the steps of:
   transporting the article in a predetermined direction, wherein the article is positioned so that a line normal to and extending from the cylindrical surface at a point at the middle of the arc length forms an acute angle to the predetermined direction; and
   irradiating the bar code with a light beam at a predetermined angle to the predetermined direction, wherein the predetermined angle is smaller than the acute angle of the normal line.

2. The method of claim 1 wherein the article having a cylindrical surface is a photographic film cartridge.

3. The method of claim 2 wherein the acute angle of the normal line intersecting the bar code is predetermined at 55 degrees.

4. A method of reading a bar code printed on a cylindrical surface of an article, wherein the printed area of the bar code has a given arc length around the cylindrical surface, the method comprising the steps of:
   transporting the article in a predetermined direction, wherein the article is positioned so that a line normal to and extending from the cylindrical surface at a point at the middle of the arc length forms an acute angle to the predetermined direction;
   sensing the passing of the article through a reading position of the bar code using a pair of photoelectric sensors; and
   starting reading of the bar code by irradiating the bar code with a light beam at a predetermined angle to the predetermined direction, wherein the predetermined angle is smaller than the acute angle of the normal line.

5. A method of reading a bar code printed on a cylindrical surface of an article, wherein the printed area of the bar code has a given arc length around the cylindrical surface, the method comprising the steps of:
   transporting the article in a predetermined direction, wherein the article is positioned so that a line normal to and extending from the cylindrical surface at a point at the middle of the arc length forms an acute angle to the predetermined direction;
   irradiating the bar code with a light beam at a predetermined angle to the predetermined direction, wherein the predetermined angle is smaller than the acute angle of the normal line; and
   reading the bar code with a bar code reading means comprising an optical scanning means and a decoding means combined in one body.

* * * * *